US011968090B2

(12) United States Patent
Chauhan et al.

(10) Patent No.: US 11,968,090 B2
(45) Date of Patent: Apr. 23, 2024

(54) DYNAMIC INSTALLATION OF MOBILE APPLICATION MODULES

(71) Applicant: T-Mobile USA, Inc., Bellevue, WA (US)

(72) Inventors: Kanakrai Gajendra Chauhan, Snoqualmie, WA (US); Navtej Paul Chilana, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 40 days.

(21) Appl. No.: 17/558,947

(22) Filed: Dec. 22, 2021

(65) Prior Publication Data

US 2023/0198844 A1 Jun. 22, 2023

(51) Int. Cl.
*G06F 15/177* (2006.01)
*H04L 41/0823* (2022.01)
*H04L 41/0866* (2022.01)

(52) U.S. Cl.
CPC ...... *H04L 41/0866* (2013.01); *H04L 41/0823* (2013.01)

(58) Field of Classification Search
CPC ............. H04L 41/0866; H04L 41/0823
USPC ........................................ 709/220
See application file for complete search history.

(56) References Cited

U.S. PATENT DOCUMENTS 7,251,812 B1 * 7/2007 Jhanwar ............ G06F 8/65
717/176
2017/0300319 A1 * 10/2017 Nachtigal ............ H04W 4/50

* cited by examiner

*Primary Examiner* — Lan Dai T Truong
(74) *Attorney, Agent, or Firm* — Lee & Hayes, P.C.

(57) ABSTRACT

A system for dynamically updating modules used by a mobile application configured on a user device may enable the more efficient use of system resources and improve the user experience. A current state of the mobile application may be determined and provided to a mobile application module service that may execute a rules engine using input based on the current state of the mobile application. The rules engine may generate a current module state for the mobile application that the mobile application can use to download currently needed modules and/or delete modules no longer needed.

20 Claims, 5 Drawing Sheets

DYNAMIC INSTALLATION OF MOBILE APPLICATION MODULES

BACKGROUND

The number of mobile devices in use worldwide has increased rapidly, as has the capabilities of such devices. Early mobile devices had limited capabilities due to hardware limitations (e.g., limited memory space and processing capabilities), which in turn required that mobile applications configured to execute on such devices make efficient use of such mobile device resources. However, like all other types of computing devices, mobile device hardware capabilities have increased greatly and therefore less emphasis has been placed on the efficient use of resources by mobile application developers. Mobile applications are initially downloaded to a mobile device in their entirety with all available features and functionality included in the mobile application. When the application is updated, an updated version of the entire application is again downloaded to the mobile device, replacing the previously installed version. In some instances, a user may be interested in and/or able to make use of a (e.g., small) portion of a mobile application's features and/or functions. In such cases, having all portions of a mobile application installed to support all of its features and functions may consume device resources to support functions that may never be used by the user, resulting in less than optimal device performance for the user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed in part to techniques for configuring a mobile application installed on a user device. In conventional systems, a mobile application is installed as a complete software component capable of performing all of the functions of that application, even if such functions are not available or appropriate to the user of the device. For example, a conventional mobile application is installed with features that may be blocked from executing based on user permissions and/or device, system, and/or network parameters, etc. Thus, a conventional mobile application may be installed with large portions of the application software remaining unused and/or unusable, thereby wasting storage space and device resources unnecessarily.

In various embodiments, a mobile application may be installed on a mobile device with an initial set of one or more software modules. A software module may be any one or more pieces of software, computer-readable data, computer-executable code, and/or any combination thereof that is configured to interoperate with one or more computer-executable applications. Examples of software modules include, but are not limited to, libraries, user interface (UI) components, user experience components, development and/or integration patterns, common core files, and computer data files of any other type.

In various embodiments, the initial set of modules may be determines based on various criteria. Such criteria may include criteria associated with the device on which the mobile application is to be installed, the user associated with the device, the services associated with the user and/or device, the network, associated with the device and/or the mobile application, and/or other systems associated with the user, the device, and/or the mobile application. For example, a mobile application may be installed on a mobile device upon activation of the mobile device by a particular user. In this example, a mobile application module service (e.g., as described in more detail herein or other system performing mobile application module determination and/or configuration) may determine the applicable user, device, and/or service parameters associated with the mobile device and the user. Based on such parameters, the mobile application module service may determine the modules to be configured with the mobile application and transmit the mobile application and the determined modules to the mobile device. Alternatively or in addition, the mobile application module service may transmit an instruction to the mobile device causing the mobile device to download or otherwise obtain the mobile application and the determined modules.

Over time, the various services and systems used by a user and/or the user's mobile device may change, affecting the potential capabilities of the mobile application that may be useful or desired by a user. For example, the user may subscribe to a new service and/or cancel a currently subscribed service accessed via the mobile application. The user's account status may change affecting the manner in which the user may interact with the mobile application. The user's payment and/or billing methods may change affecting the manner in which the user may use the mobile application to perform financial transactions. As will be appreciated, the various combinations of services and systems potentially accessed by a user of a mobile device and/or mobile application are numerous.

In various embodiments, the mobile application will determine a current state based on the various parameters associated with the user and/or the user's mobile device and transmit an indication of the mobile application state to a mobile application module service to request a current module state for the mobile application. The mobile application may determine mobile application state information based on local data (e.g., username, account number, device model and/or serial number, etc.). The mobile application may also, or instead, query a remote system for such mobile application state information. For example, the mobile application may request a current billing status, account balance, due, and/or service usage information from a provider system.

The mobile application may be configured to determine a current mobile application state and transmit a module update request to a mobile application module service at predefined intervals and/or in response to detected activities. For example, the mobile application may be configured to determine a current mobile application state and transmit a module update request upon activation of the mobile application (e.g., when the application is executed by the user). In another example, the mobile application may be configured to determine a current mobile application state and transmit a module update request upon deactivation of the mobile application (e.g., in response to detecting an application termination instruction). Alternatively, or in addition, the mobile application may be configured to determine a current mobile application state and transmit a module update request at preconfigured time intervals, for example, as part of a mobile device's "heartbeat" function. A "heartbeat" may be a periodic signal generated by a user device to indicate to the network and/or provider a status of operation (e.g., normal operation, errors detected, etc.) of the user's device and/or applications configured thereon.

In various embodiments, the mobile application may be configured to determine a current mobile application state at such intervals and/or in response to detected activities, but conditionally transmit a module update request based on whether the state has changed since the mobile application state was previously determined. For example, if no parameters upon which the mobile application state is determined have changed, the current mobile application state may be the same as the previous mobile application state. If the current and previous states are the same, the mobile application may be configured to not transmit a module update request, thereby preventing unnecessary resource utilization. However, if the current and previous states differ, the mobile application may be configured to transmit a module update request to ensure that the mobile application modules are up to date based on the current (updated) mobile application state.

In response to receiving the module update request (that may include current mobile application state data) from the mobile application, the mobile application module service may execute a mobile application module rules engine to determine the modules to be currently configured with the mobile application on the user's device. In various embodiments, the mobile application module service may execute the mobile application module rules engine based on data (e.g., current mobile application state data) included with the module update request. Alternatively, or in addition, the mobile application module service may determine and/or generate data for use in executing the rules engine based on the data included with the module update request. For example, the mobile application module service may identify a user identifier (e.g., username, account number, etc.) in the module update request and may then use this user identifier to query a service provider system (e.g., billing system, payment system, etc.) to obtain additional data (e.g., account status, payment due information, how long the user has been a customer, etc.) that it may then use in executing the rules engine.

Based on the data input by the mobile application module service, the mobile application module rules engine may evaluate a set of module rules to determine the particular one or more modules to be configured with the mobile application on the user's device. The mobile application module service may then transmit a module update indication indicating the current one or more modules to be configured with the mobile application to the mobile application on the user's device. This indication may operate as an instruction to the mobile application to obtain (e.g., download) any modules not already configured on the user's device and/or to delete any modules not included in the indication from the user/s device. For example, the rules engine may have determined that the user is a new customer, and so the module update indication will not include a payment module since new customer of the user's type do not make payments for 60 days. IF the rules engine determined that the user is a no longer a new customer (e.g., has been a customer for longer than 60 days), the module update indication will include an identifier of a payment module so that the user is now able to access payment features of the mobile application.

The mobile application may be preconfigured with identifying information for a module database or other system from which the mobile application may download modules identified in the module update indication. Alternatively or in addition, the module update indication may include identifying information for a module database or other system from which the mobile application may download modules identified in the module update indication. The module update indication may also, or instead, include one or more of the modules, thereby providing those one or more modules to the mobile application without requiring that the mobile application take additional action to obtain such one or more modules.

In response to receiving the module update indication, the mobile application may determine whether one or more of the modules indicated in the module update indication are configured on the user's device. If not, the mobile application may download the one or more modules not already installed from an indicated or preconfigured source and/or otherwise install the missing modules (e.g., as received in the module update indication). The mobile application may also, or instead, determine whether there are modules installed and associated with the mobile application that are not indicated in the module update indication. If so, the mobile application may delete those modules from the user's device. In various embodiments, the module update indication may be a complete listing of the modules that are to be currently configured on the user's device for use with the mobile application, and therefore, any modules configured on the user's device that are associated with the mobile application but not indicated in the module update indication may be deleted to conserve device and system resources.

By facilitating the dynamic updating of modules used with a mobile application, systems and methods described herein can improve the performance of mobile device and mobile applications and increase the efficient use of device and system resources, while improving the user experience by ensuring that the user will have access to the appropriate application features when the application is in use. The systems and methods described herein may utilize (e.g., in a mobile application module rules engine) the various algorithmic, expert system, and machine-learned processes described herein in combination with application, system, and user information to more accurately and efficiently determine the modules to be configured for user with a mobile application. For example, the methods and systems described herein may be faster and/or more robust than conventional techniques, as they may increase the reliability of the operational systems (e.g., mobile applications executing on a mobile device) and reduce the time and cost associated with executing and updating such systems. That is, the methods and systems described herein provide a technological improvement over existing mobile application maintenance systems and processes by facilitating a current and consistent user experience. In addition to improving the efficiency of mobile application maintenance and updating, the systems and methods described herein can provide more robust systems by, for example, allowing for the replacement of particular modules to address mobile application issues and update features without affecting unrelated modules.

An illustrative environment and illustrative techniques for dynamically updating mobile application modules are described below. However, the described techniques may be implemented in other environments.

Illustrative System Architecture

Figure 1:
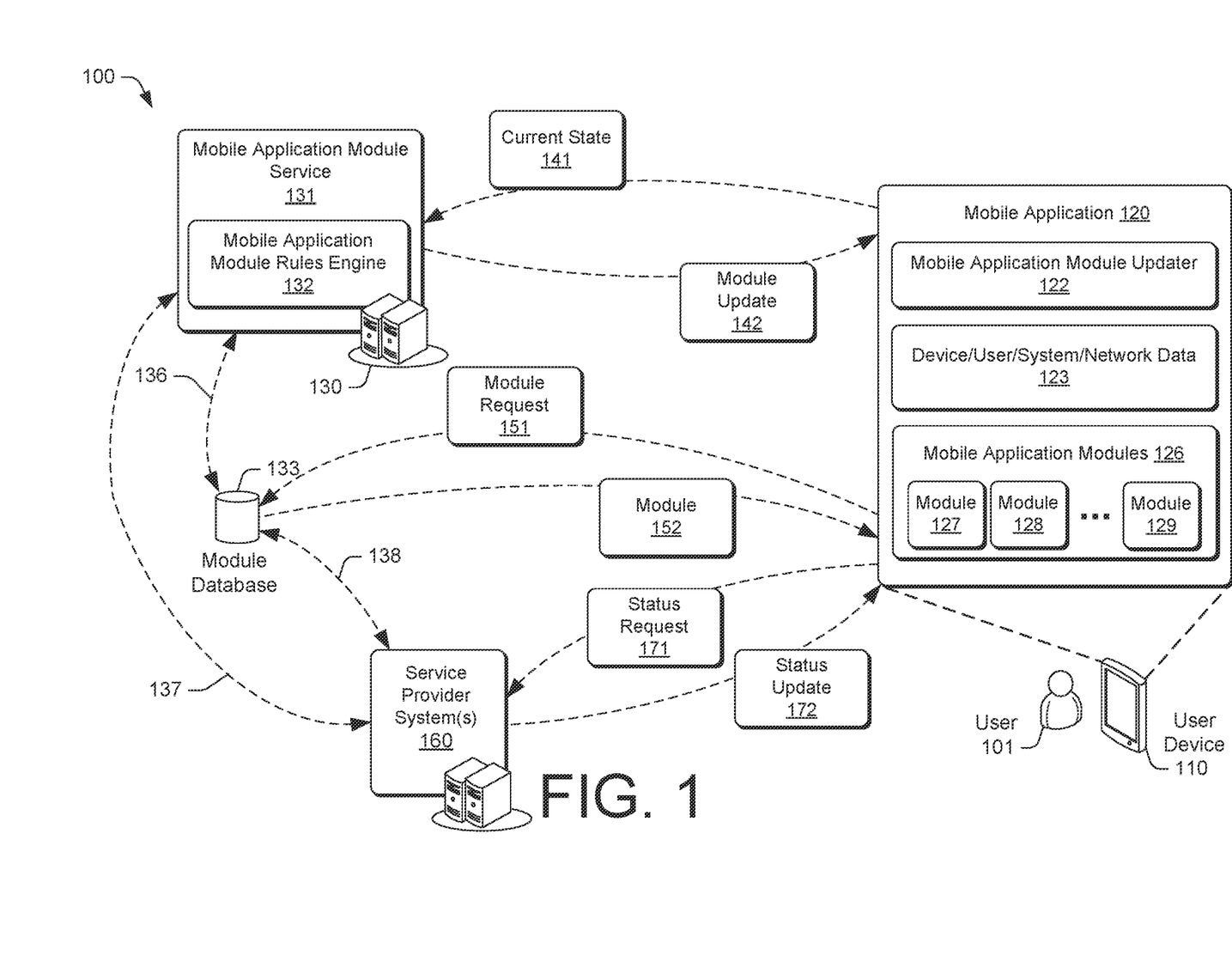
FIG. 1 is a schematic diagram of an illustrative computing environment for dynamically installing mobile application modules on a user device.

FIG. 1 is a schematic diagram of an illustrative computing environment 100 for configuring modules associated with a mobile application on a user device. The computing environment may include a user device 110 that may be operated by a user 101. The user device may be any type of computing device. In particular embodiments, the user device 110 is a mobile computing device, such as a smart phone or tablet. In other embodiments, the user device 110 may be any type of wireless communications device, including an Internet-of-Things (IoT) device, a wearable computing device, a laptop computer, and/or any other type of computing device configured with any type of wireless communications capability. A mobile application 120 may be installed on the user device 110. The mobile application 120 may be configured with a subset of features and functions that the mobile application is capable of providing. These functions and features may be facilitated by mobile applications modules 126 that may include any number of modules 127, 128, 129, etc. These modules may each be any type of software module and/or computer readable data, such as one or more pieces of software, computer-readable data, computer-executable code, and/or any combination thereof that is configured to interoperate with the mobile application 120. Examples of software modules include, but are not limited to, libraries, UI components, user experience components, development and/or integration patterns, common core files, and computer data files of any other type.

The mobile application 120 may be further configured with a mobile application module updater 122. The mobile application module updater 122 may be configured to collect and/or determine data 123 to use in generating a current state message and/or module query that the mobile application module updater 122 may send to a mobile application module service to facilitate the determination of whether to update the mobile application modules 126. The mobile application module updater 122 may generate and send a current state message and/or module query to a mobile application module service periodically and/or in response to one or more detected activities as described herein. The data 123 may be any of various device, user, system, and/or network parameters that may be stored on the user device 110 and retrievable or determinable by the mobile application module updater 122. Alternatively, or in addition, the mobile application module updater 122 may generate the data 123 as needed and/or periodically based on other data collected, retrieved, and or determined on the user device 110. Alternatively, or in addition, the mobile application module updater 122 may generate the data 123 as needed and/or periodically based on other data collected, retrieved, and or determined on one or more other (e.g., remote) systems, such as a service provider system.

The computing environment 100 may include a mobile application module service 131 hosted at a computing system 130 (e.g., one or more servers or systems that may provide services to a mobile device and/or wireless network). The mobile application module service 131 may analyze a current state message and/or module query received from a mobile application configured on a user device to generate data to be used as input to a mobile application module rules engine 132. The mobile application module rules engine 132 may evaluate a set of module rules using this input to determine a current module state for the mobile application associated with the current state message and/or module query from which the input data was determined. The mobile application module service 131 may then respond to the mobile application with a module update message providing the current module state to be configured at the mobile application. In some embodiments, the module update message may include identifiers for one or more modules, instructions and/or locations of one or more modules, and/or one or more modules.

The computing environment 100 may include a module database 133 that may store and/or serve one or more mobile application modules. In various embodiments, the module database 133 may respond to requests for modules from mobile application executing on user devices by transmitting the requested modules to such devices. Alternatively, or instead, the module database 133 may receive modules from and/or transmit modules to one or more service provided systems and/or one or more mobile application modules services.

The computing environment 100 may include one or more service provider systems 160 that may provide services and data related to a user, user device, network, and/or system associated with a mobile application. For example, the service provider system(s) 160 may maintain, generate, and/or provide data and/or services associated with user accounts, payments, billing, network usage, device usage, transactions, shopping, etc. The service provider system(s) 160 may interact with any of a module database, a mobile application module service, and/or a mobile application configured on a user device, receiving and/or providing data and/or services from any such systems.

In an illustrative example, the mobile application module updater 122 may generate a current state message 141 based on device, user, system, and/or network data 123. Some or all of the data 123 may be stored on the user device 110 and retrieved by mobile application module updater 122. Alternatively, or in addition, the some or all of the data 123 may be generated by the mobile application module updater 122 using other data existing on the user device 110 and/or retrieved from another system. For example, the mobile application 120 may determine a device and/or user identifier for the user device 110 (e.g., retrieve a network address or user identifier from memory of the user device 110). The mobile application 120 may then transmit a status request 171 to the service provider system(s) 160 requesting an account status, user status, usage data, other user identifier, other device identifier, etc. The service provider system(s) 160 may determine status information and/or other data based on the data in the status request 171 and reply with a status update 172. The mobile application 120 may then determine one or more pieces of data 123 based on the status update 172.

The mobile application module updater 122 may transmit the current state message 141 to the mobile application module service 131. The mobile application module service 131 may extract or otherwise determine state data (e.g., one or more parameters associated with the mobile application 120, the user 101, and/or the user device 110) from the current state message 141. The mobile application module service 131 may use this state data to determine and/or generate input data for the mobile application module rules engine 132. In various examples, the mobile application module service 131 may obtain data that may be used as (e.g., a portion of) input data for the mobile application module rules engine 132 from one or more other systems. For example, the mobile application module service 131 may communication 137 with the service provider system(s) 160 to obtain information that may be used as input data, such as account information, usage information, payment information, billing information, etc.

Using the determined input data, the mobile application module service 131 may execute the mobile application module rules engine 132 to determine a current module state for the mobile application 120. The determined current module state may indicate the particular modules to be configured with the mobile application 120 based on the particular context associated with the mobile application 120 (e.g., based on user, device, system, account, usage, payment, network, etc. parameters). The determined current module state may also, or instead, indicate various configuration parameters and/or characteristics of the modules and/or various configuration parameters and/or characteristics of the mobile application 120. The mobile application module service 131 may determine a current module state based on modules that are currently available for the mobile application 120. For example, to ensure that the mobile application module service 131 provides current module versions and other module information to the mobile application 120, the mobile application module service 131 may communicate 136 with the module database 133 to determine current available module information. The module database 133 may also, or instead, communicate 138 with the service provider system(s) 160 to determine current module information and/or other information that may assist in determining currently available and suitable modules for a mobile application.

The mobile application module service 131 may generate a module update message 142 that includes an indication of the current module state and/or associated data. For example, the module update message 142 may include identifiers of the modules (e.g., all modules) that should currently be configured with the mobile application 120. Alternately, or in addition, the module update message 142 may include identifiers and/or locations of module sources (e.g., module databases). Alternately, or in addition, the module update message 142 may include a portion or the entirety of one or more modules.

In various embodiments, the module update message 142 may include one or more flags that indicate one or more associated features to be supported by the mobile application 120. Based on these flags, the mobile application module updater 122 may determine the particular modules to be configured with mobile application modules 126. For example, the mobile application module updater 122 may have a set of rules that maps modules to features (e.g., feature flags). Using this mapping, the mobile application module updater 122 may determine the modules to be configured in mobile application modules 126.

In response to receiving the module update message 142, the mobile application module updater 122 may analyze the modules currently configured on the user device 110 and/or associated with the mobile application 120 to determine whether, based on the current module state indicated by the module update message 142, any modules are to be added or removed from the mobile application modules 126. In an example, the mobile application module updater 122 may determine that one or more modules currently configured on the user device 110 and associated with the mobile application 120 are not included in the current module state indicated by the module update message 142. In response, the mobile application module updater 122 may delete or otherwise remove such modules from the mobile application modules 126 (e.g., delete from storage and/or memory of the user device 110).

The mobile application module updater 122 may also, or instead, determine that one or more modules included in the current module state indicated by the module update message 142 are not currently configured on the user device 110 and/or associated with the mobile application 120. In response, the mobile application module updater 122 may perform one or more actions to acquire such modules. For example, the mobile application module updater 122 may transmit a module request 151 to the module database 133 requesting (e.g., initiating a download of) a module 152. In response to the module request 151, the module database may transmit or otherwise facilitate the download of the module 151 to the user device 110. The mobile application module updater 122 may add or otherwise store the module 152 in the mobile application modules 126 (e.g., store in storage and/or memory of the user device 110).

Example Components

Figure 2:
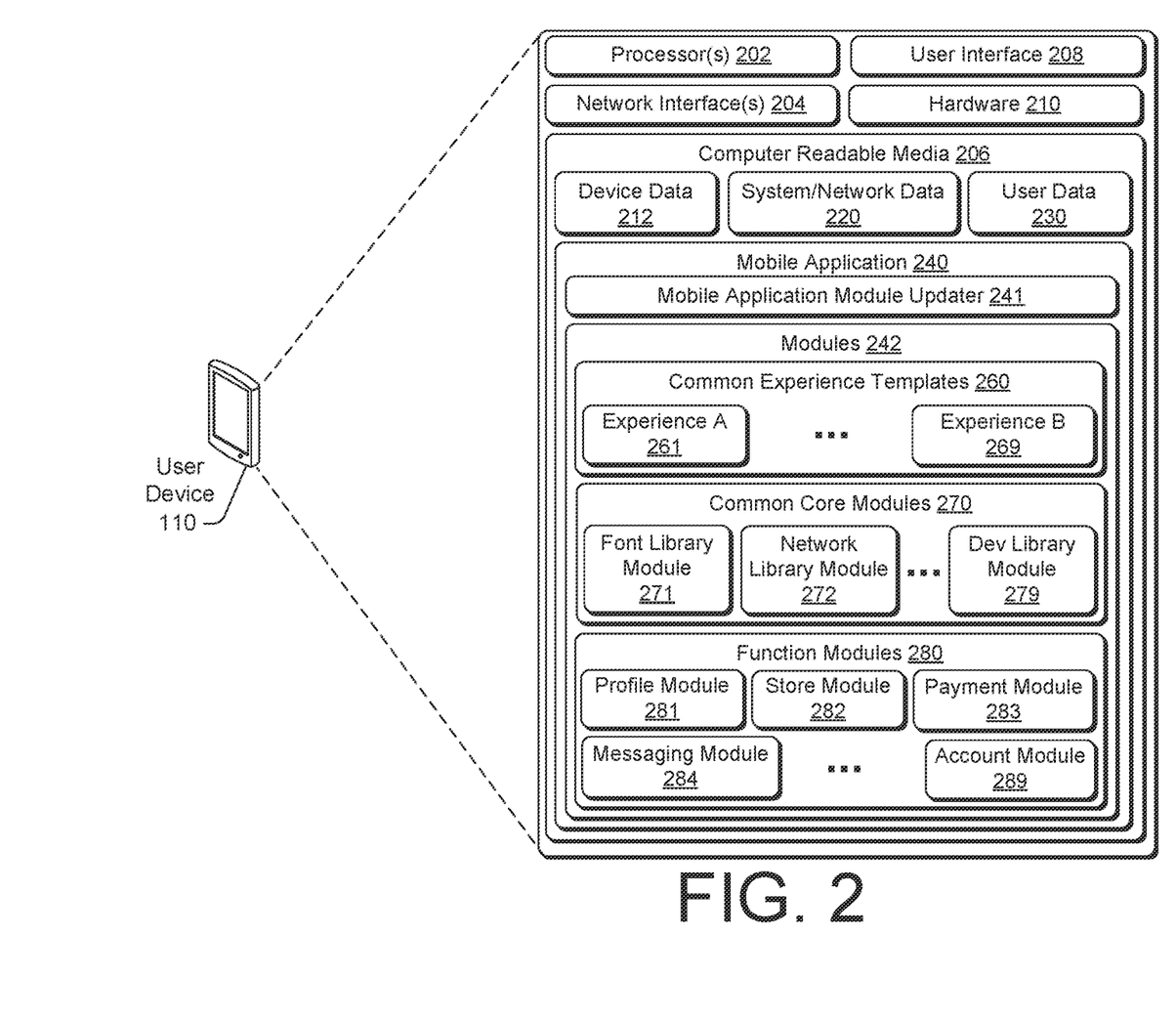
FIG. 2 is a schematic diagram of illustrative components in an example user device that is configured for dynamically installing and/or removing mobile application modules on the user device.

FIG. 2 is a schematic diagram of illustrative components in the example user device 110 that may be configured with a mobile application that may dynamically update its modules. The user device 110 may include processor(s) 202 and computer readable media 206. The computer readable media 206 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic and/or optical cards, solid-state memory devices, and/or other types of storage media suitable for storing electronic instructions.

The user device 110 may also include a network interface 204, a user interface 208, and hardware component 210. The network interface 204 may include wireless and/or wired communication components that enable the user device 110 to transmit data to and receive data from other devices via the network. For example, the network interface 204 may include a cellular communication transceiver, a Wi-Fi transceiver, a wired network interface transceiver, and so forth.

The user interface 208 may enable a user to provide inputs and receive outputs from the user device 110. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. The hardware component 210 may include an internal clock, a sound card, a video card, a camera, device interfaces, motion sensors, inertia sensors, proximity sensors, a compass, and/or other components that enable the user device to perform designed functions.

The computer readable media 206 may store a mobile application 240, device data 212, system and/or network data 220, and/or user data 230. The mobile application 240 may include a mobile application module updater 241 and one or more modules 242. As described herein, the mobile application module updater 241 may be configured to periodically and/or responsively (e.g., in response to one or more detected activities or conditions) communicate with a mobile application module service to dynamically update the modules 242. In various embodiments, the mobile application module updater 241 may include a mapping and/or a set of rules that maps modules to flags and/or other data that may be provided in a module update message and that the mobile application module updater 241 may use to determine the modules to be included in the modules 242.

The modules 242 may include one or more pieces of software, computer-readable data, computer-executable code, and/or any combination thereof that is configured to interoperate with one or more computer-executable applications. For examples, the modules 242 may include one or more common experience templates 260 (e.g., experience A 261, experience B 269 etc.). The common experience templates 260 may include templates and/or other data that may be used to generate user interfaces and/or other application aspects associated with user interaction. For example, the common experience templates 260 may include templates for user interfaces that may be used to generate a variety of graphical user interfaces (GUIs) while ensuring that such GUIs maintain a common or similar user experience by, for example, using consistent fonts, colors, language, images (e.g., brand images, logos, etc.), and/or styles, across interfaces. The common experience templates 260 may use and/or may be available for use with other modules, such as function modules, to generate interfaces, thereby relieving the need for such modules to include their own user experience aspects. The common experience templates 260 may each include one or more modules associated with the respective template and/or one or more references to one or more other modules that may be used by the respective template.

In various examples, a particular experience template may be used for a user having particular attributes. For example, experience template 261 may be used for a user that has wireless communications services and may facilitate the generation of user interfaces that include wireless product images and information, while experience template 269 may be used for a user that has a streaming video service and may facilitate the generation of user interfaces that include streaming product images and information.

In various embodiments, the modules 242 may also, or instead, include one or more common core modules 270 (e.g., font library module 271, network library module 272, dev library module 279, etc.). The common core modules 270 may include libraries and/or other files that include functions and/or data that may be used by other modules and/or the mobile application 240 for commonly performed functions. For example, the font library module 271 may include font definitions and data that may be used by other modules and/or the mobile application 240 to generate user interfaces using a same font or set of fonts. The network library module 272 may include functions and data that allow other modules and/or the mobile application 240 to communicate with other devices, applications, and/or modules using the network communications resources (e.g., network interface 204) of the user device 110. The dev library module 279 may include headers and other data that provide information to facilitate the activation of particular modules by other modules and/or the mobile application 240. The common core modules 270 may use and/or may be available for use with other modules, such as function modules, to perform common functions, thereby relieving the need for such modules to include their own common core aspects. The common core modules 270 may each include one or more modules associated with the respective common core module and/or one or more references to one or more other modules that may be used by the respective common core module.

In various embodiments, the modules 242 may also, or instead, include one or more function modules 280 (e.g., profile module 281, store module 282, payment module 283, messaging module 284, account module 289, etc.). The function modules 280 may include module that perform particular activities related to a specific function. In performing their respective functions, the function modules 280 may call, invoke, or otherwise make use of one or more other modules. For example, the profile module 281 may include functions that determine, obtain, and/or update user profile information, including, in examples, generating user interfaces to perform profile-related activities. The store module 282 may include functions that generate and present shopping interfaces, collect purchase requests, accept transaction data, etc. The payment module 283 may include functions that generate and present payment interfaces, collect payment (e.g., for a user account), collect, store, and/or delete payment information (e.g., credit card information, bank account information, etc.), etc. The messaging module 284 may include functions that generate and present messaging interfaces and facilitate messaging activities (e.g., helpdesk messaging with a provider, social messaging, etc.). The account module 289 may include functions that generate and present user account information and facilitate user account modifications (e.g., upgrade or downgrade service, add services, remove services, etc.). The function modules 280 may use and/or may be available for use with other modules to perform particular functions, thereby relieving the need for the functions modules to also include their own common core aspects and/or template aspects. The function modules 280 may each include one or more modules associated with the respective function module and/or one or more references to one or more other modules that may be used by the respective function module.

The device data 212 stored in the computer-readable media 206 may include device-specific data that may be used in determining a current state of the mobile application 240 and/or the user device 110 for performing dynamic updating of the modules 242 of the mobile application 240. For example, the device data 212 may include locally stored device information and/or device information that may be obtained from one or more remote systems (e.g., service provider systems). Such device information may include a device identifier, serial number, model number, capabilities, hardware profile, etc.

The system and/or network data 220 stored in the computer-readable media 206 may include network- and/or system-specific data that may be used in determining a current state of the mobile application 240 and/or the user device 110 for performing dynamic updating of the modules 242 of the mobile application 240. For example, the system and/or network data 220 may include locally stored system and/or network information and/or system and/or network information that may be obtained from one or more remote systems (e.g., service provider systems). Such system and/or network information may include a network address, network identifier, provider identifier, etc.

The user data 230 stored in the computer-readable media 206 may include user- and/or user account-specific data that may be used in determining a current state of the mobile application 240 and/or the user device 110 for performing dynamic updating of the modules 242 of the mobile application 240. For example, the user data 230 may include locally stored user and/or account information and/or user and/or account information that may be obtained from one or more remote systems (e.g., service provider systems). Such user and/or account information may include a user identifier, username, account identifier, account status, user status, user type, account status, etc.

Figure 3:
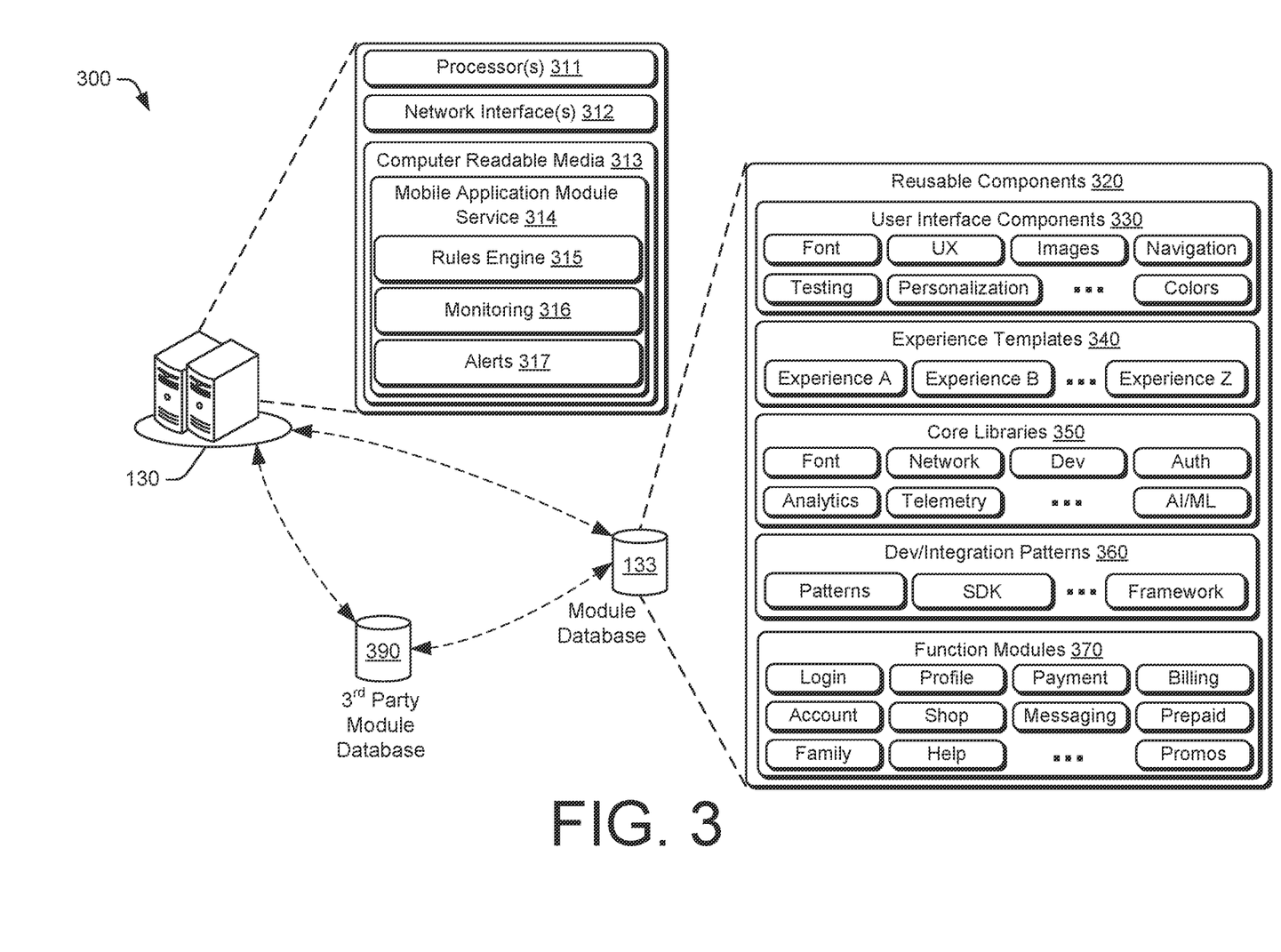
FIG. 3 is a schematic diagram of illustrative components in an example server and module databases that are configured for facilitating the dynamic installation of mobile application modules on a user device.

FIG. 3 is a schematic diagram of illustrative components in an example module update system 300 that includes a computing system 130 hosting a mobile application module service 314, a module database 133, and a third-party module database 390. The module update system 300 may be configured to interact with the user device 110 to dynamically update modules on the user device 110 that are associated with a mobile application configured on the user device 110. The computing system 130 may include processor(s) 311 and computer readable media 313. The computer readable media 313 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic and/or optical cards, solid-state memory devices, and/or other types of storage media suitable for storing electronic instructions.

The computing system 130 may also include a network interface 312 that may include wireless and/or wired communication components that enable the computing system 130 to transmit data to and receive data from other devices via the network. For example, the network interface 312 may include a cellular communication transceiver, a Wi-Fi transceiver, a wired network interface transceiver, and so forth.

The computer readable media 313 may store a mobile application module service 314 that may include a rules engine 315, a monitoring component 316, and an alerts component 317. As described herein, the mobile application module service 314 may be configured to determine a module state for a mobile application based on a current state of the mobile application and/or the user device executing the mobile application. The current state for the mobile application may be received in a message from the mobile application (e.g., from a mobile application module updater). In response to such a message, the mobile application module service 314 may determine and/or generate, based on the message, input reflecting the current state of the mobile application. The mobile application module service 314 may then use this input to execute the rules engine 315 to generate a current, appropriate module state for the mobile application associated with the current state. The mobile application module service 314 may then generate a responsive message indicating the current module state for the mobile application and transmit the message to the mobile application.

In response to receiving the message indicating the current module state for the mobile application, the mobile application may then download one or more modules from the module database 133. The module database 133 may include one or more reusable components 320, each of which may be a module as described herein and available for downloading to a user device for use with a mobile application. Among the reusable components 320 may be user interface components 330 that may include user-interface-specific modules, such as one or more font modules, user experience (UX) modules, image modules, navigation modules, testing modules, personalization modules, colors modules, etc. By using a common set of user interface modules for multiple functions performed by a mobile application, the user experience may be consistent.

Among the reusable components 320 may also, or instead, be experience templates 340 that may include various templates that may be used by as mobile application and/or its associated modules to generate a consistent user experience (e.g., in appearance, feel, function, sound, etc.) across multiple functions that may be performed by a mobile application.

Among the reusable components 320 may also, or instead, be core libraries 350 that may include various libraries and data files that may be used by an application and/or it associated modules to perform common tasks and activities, thereby preventing the need for each module to define and store its own set of instructions to perform such common tasks and activities. For example, the core libraries 350 may include reusable components for fonts, network functions, development functions, authorization functions, analytics, telemetry, artificial intelligence (AI) functions, and/or machine learning (ML) functions.

Among the reusable components 320 may also, or instead, be development and/or integration patterns 360 that may include various patterns and/or frameworks for interacting with other modules and/or applications such as software development kit (SDK) data, API's frameworks, and other patterns that may be used to interact with one or more other pieces of software.

Among the reusable components 320 may also, or instead, be function modules 370 that may include modules for performing various specific functions that may be configured with a mobile application. For example, the function modules 370 may include modules for performing one or more login, profile, payment, billing, account, shop, messaging, prepaid, family, help, promotions functions, and/or other account management functions.

In various embodiments, the module update system 300 may include the third-party module database 390. The third-party module database 390 may include any of the modules, data files, and/or other pieces of software described herein in regard to modules that may be dynamically updated by a mobile application. The third-party module database 390 may not be associated with the provider and/or operator of the mobile application module service and/or the user device executing a mobile application that dynamically updates modules as described herein. A mobile application may communicate directly with the third-party module database 390, for example, sending a module request to the third-party database 390. Alternatively, or in addition, the module database 133 and/or the mobile application module service 314 may interact with the third-party module database 390 on behalf of the mobile application, relaying one or more modules from the third-party module database 390 to the mobile application.

In various embodiments, in response to determining the current module state for the mobile application, the mobile application module service 314 retrieve one or more modules from the module database 133 and/or the third-party module database 390 and transmit the modules to the mobile application.

In various embodiments, the mobile application module service 314 may include a monitoring component 316 that may monitor various aspects of the module update system 300. For example, the monitoring component 316 may monitor the module database 133 and/or the third-party module database 390 for module updates to integrate into the rules of the rules engine 315. In this way, if a module receives an update, the rules engine will determine that any mobile application making use of that module will need to update the module.

In various embodiments, the mobile application module service 314 may include an alerts component 317 that may generate alerts in response to detecting particular conditions in the module update system 300. For example, the alerts component 317 may monitor the module database 133 and/or the third-party module database 390 for outages or other resource issues and generate an alert to user if an abnormal condition is detected. In another example, the alerts component 317 may detect that the module database 133 and/or the third-party module database 390 has failed and responsively reconfigure the mobile application module service 314 to provide an alternate module download location to mobile applications requesting module updates.

Illustrative Operations

Figure 4:
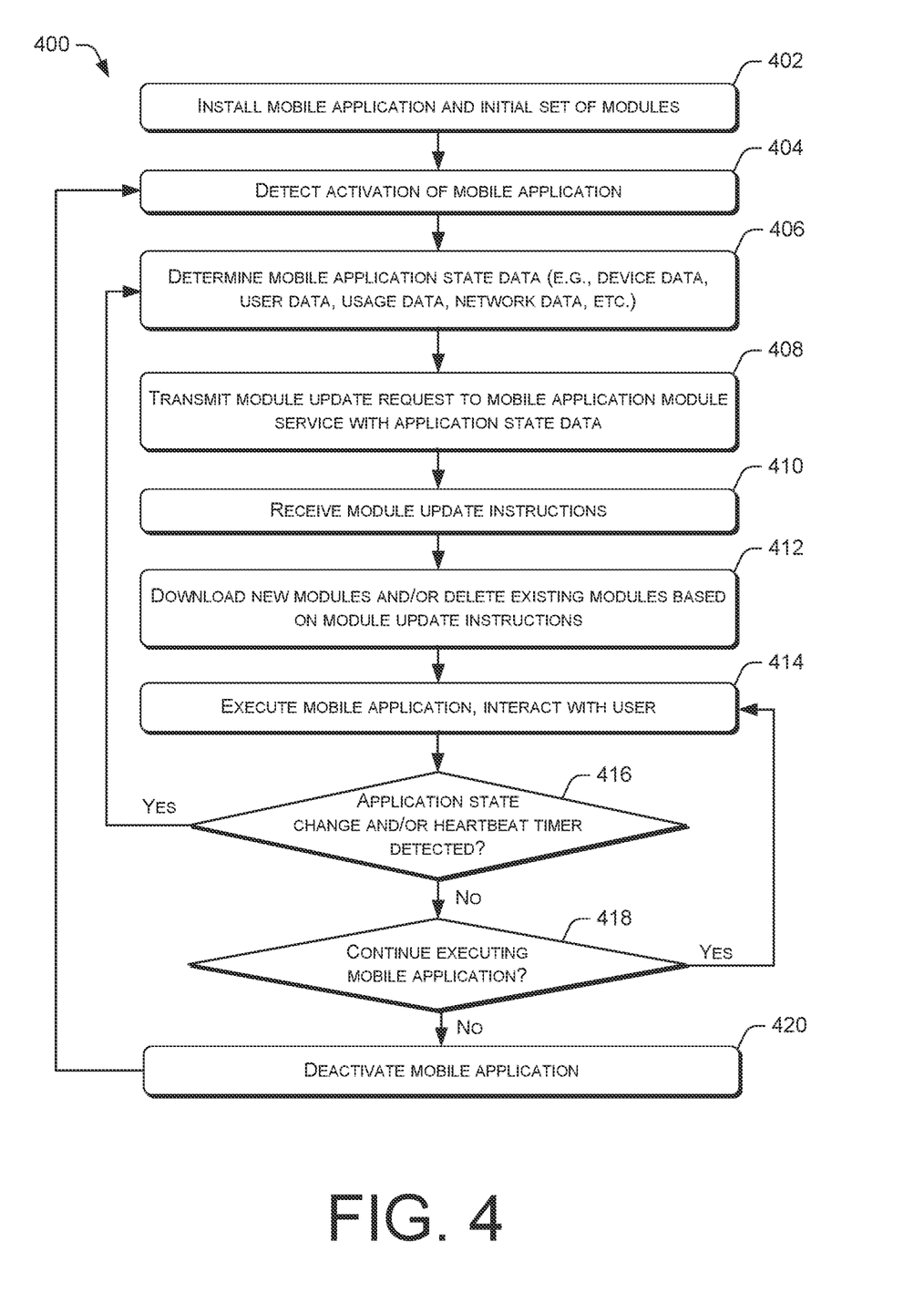
FIG. 4 is a flow diagram of an illustrative process for dynamically installing mobile application modules on a user device.

FIG. 4 shows a flow diagram of an illustrative process 400 for dynamically updating mobile application modules on a user device. The process 400 is illustrated as a collection of blocks in a logical flow diagram, which represents a sequence of operations that can be implemented in software and executable in hardware. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be omitted and/or combined in any order and/or in parallel to implement the processes. For discussion purposes, the process 400 is described with reference to the computing environment 100 of FIG. 1, however other environments may also be used.

At block 402, a mobile application, including one or more modules, may be installed on a user device, such as the user device 110. At block 404, an activation (e.g., execution, bring to foreground, etc.) of the mobile application may be detected. For example, the user 101 of FIG. 1 may activate the mobile application 120 on the user device 110.

In various embodiments, a mobile application may be configured to perform a module update query at each activation. Alternatively, or in addition, the mobile application may be configured to perform a module update query at those activations that occur after a threshold amount of time has passed since the most recent previous module query update. For example, to conserve resources, the mobile application may be configured to perform a module update query in response to activation of the application if more than an hour has passed since the last module update query (e.g., do not perform a module update query in response to activation of the application if less than an hour has passed since the last module update query).

At block 406, to proceed with the module update query, the mobile application (e.g., a mobile application module updater, such as the mobile application module updater 122 of FIG. 1) determines mobile application state data (e.g., data 123 of FIG. 1) based on one or more prices of data as described herein. For example, the mobile application may obtain and/or determine various state criteria associated with the device, the user, network, the service provider, etc. as described herein.

At block 408, the mobile application (e.g., a mobile application module updater, such as the mobile application module updater 122 of FIG. 1) generates a module update request. The module update request may be a current state message, such as current state message 141 of FIG. 1. The mobile application may transmit the module update request to a mobile application module service (e.g., the mobile application module service 131 of FIG. 1). The mobile application module service may use the module update request to determine a current module state for the mobile application as described herein (e.g., determining input to a rules engine executed to determine the current module state). The determined current module state may indicate the particular modules to be configured for the mobile application based on the particular context associated with the mobile application (e.g., as determined based, at least in part, on the module update request). The mobile application module service may use the current module state to generate a module update instructions message (e.g., module update message 142 of FIG. 1) that may include indications of current modules to be configured with the mobile application. The module update instructions message may also, or instead, include one or more configuration parameters and/or characteristics of the modules and/or various configuration parameters and/or characteristics of the mobile application. The module update instructions message may also, or instead, include identifiers and/or locations of module sources (e.g., module databases) and/or a portion or the entirety of one or more modules. At block 410, this module update instructions message may be received by the mobile application (e.g., at a mobile application module updater). In various embodiments, the module update instructions message may include one or more flags that indicate one or more features of the mobile application that should be supported by the mobile application. Based on these flags, the mobile application may determine the particular modules to be configured with the mobile application. In various embodiments, the mobile application may use a set of rules to map modules to features (e.g., feature flags).

In response to receiving the module update instructions message, at block 412 the mobile application may analyze the modules currently configured on the user device and/or associated with the mobile application to determine whether, based on the module update instructions message, any modules are to be added or removed from the set of modules associated with the mobile application. Further at block 412, the mobile application may determine that one or more modules currently configured on the user device and associated with the mobile application are not indicated in the module update instructions message and may, in response, delete such modules. Further at block 412, the mobile application may determine that one or more modules indicated in the module update instructions message are not currently configured on the user device and associated with the mobile application and may, in response, download those modules and/or take one or more actions to acquire such modules. At block 414, the mobile application may execute using the newly acquired modules as applicable.

At block 416, the mobile application may determine if a condition has occurred that triggers a module update request. The mobile application may be configured with a set of conditions that, when detected, trigger the update request. For example, the mobile application may be configured to detect user activities that may trigger a module update request, such as a change to the user's profile or services. In another example, the mobile application may be configured to detect the condition of a threshold amount of time having passed since a most recent previous module update request was generated. In another example, the mobile application may be configured to detect the condition of a "heartbeat" time interval (or number of time intervals) has passed and/or a heartbeat message (or number of heartbeat messages) has been generated, where a heartbeat message is a routine scheduled interaction with the provider of the network on which the user device is operating. In various embodiments, the mobile application may be configured to detect the condition of one or more of the criteria associated with a current state of the mobile application (e.g., the state data sent with a module update request) has changed. In various embodiments, the mobile application may be configured to detect the condition of deactivating the mobile application.

If a module update request triggering condition has been detected at block 416, the process 400 may return to block 406 to perform the module update query process. If no module update request triggering condition has been detected at block 416, the process 400 may continue to block 418 to determine whether to continue executing the mobile application. If so, the process 400 returns to block 414 to continue to monitor for module update request triggering conditions. If the mobile application is to be deactivated or otherwise is not to continue executing, the process 400 continues to block 420 where the mobile application is deactivated and then returns to block 404 to await the next activation of the mobile application.

In various embodiments, the mobile application may be activated for the purposes of performing a module update query. For example, even though the module has not been initiated by a user, at a heartbeat interval, the mobile application may be activated by the user device at block 404 and the module update query operations may be performed, deactivating the mobile application upon completion.

Figure 5:
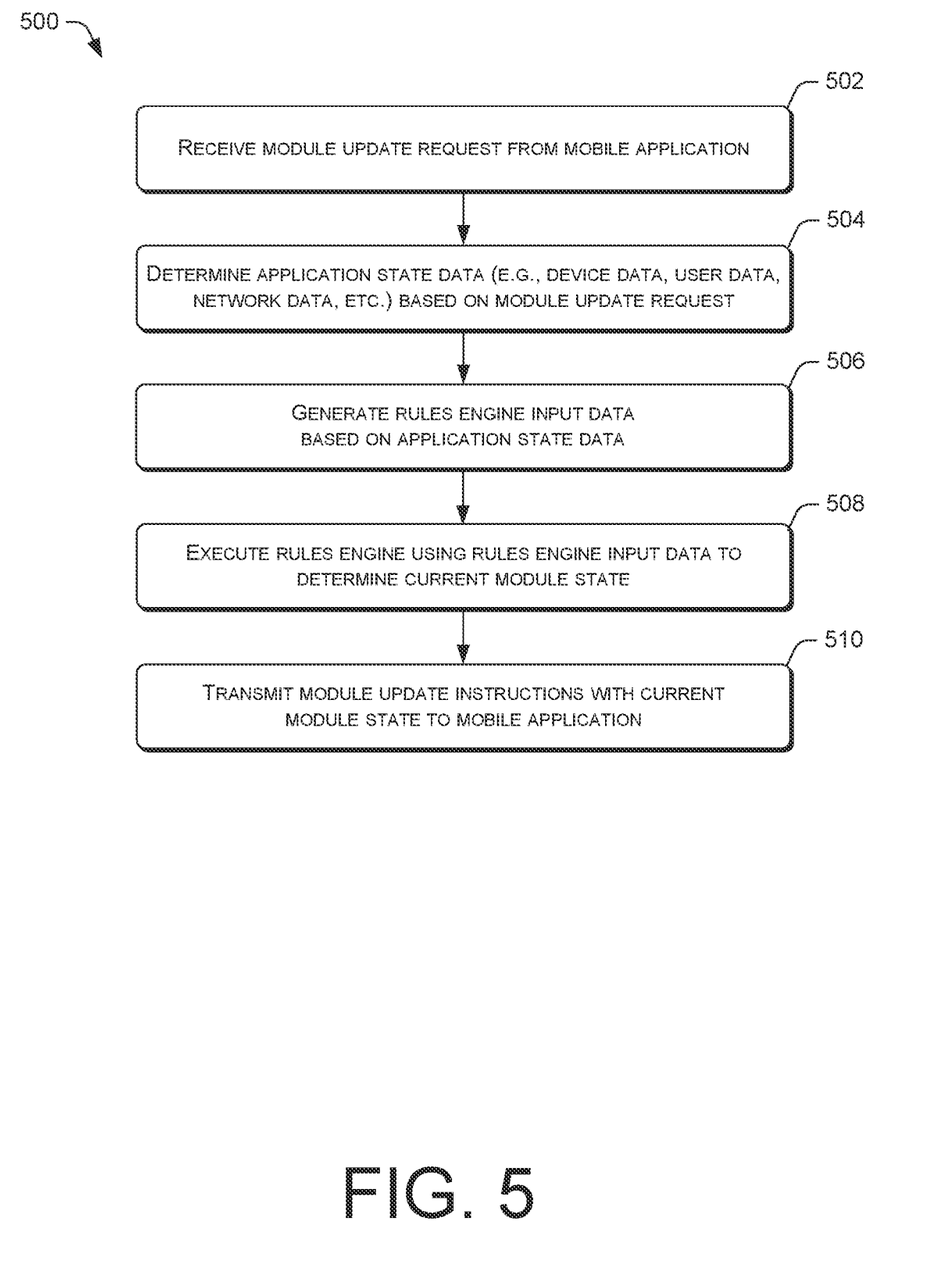
FIG. 5 is a flow diagram of an illustrative process for determining module update instructions for a user device.

FIG. 5 shows a flow diagram of an illustrative process 500 for dynamically providing updated mobile application modules to a user device. The process 500 is illustrated as a collection of blocks in a logical flow diagram, which represents a sequence of operations that can be implemented in software and executable in hardware. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be omitted and/or combined in any order and/or in parallel to implement the processes. For discussion purposes, the process 500 is described with reference to the computing environment 100 of FIG. 1, however other environments may also be used.

At block 502, a mobile application module service (e.g., the mobile application module service 131 of FIG. 1) may receive a module update request (e.g., the current state message 141 of FIG. 1) from a mobile application executing on a user device (e.g., the mobile application 120 configured on the user device 110 of FIG. 1).

At block 504, the mobile application module service may extract or otherwise determine mobile application state data (e.g., one or more parameters associated with the mobile application, the user, and/or the user device) based on the module update request. The mobile application module service may determine this state data from the module update request and/or use data in the module update request to generate and/or obtain state data. For example, the mobile application module service may extract a username from the module update request and transmit the username to a service provider system with a request for device information to retrieve device information that may serve as part of the application state data.

At block 506, the mobile application module service may use application state data to determine and/or generate input data for a mobile application module rules engine. In various examples, the mobile application module service may obtain data used as (e.g., a portion of) input data for the mobile application module rules engine from one or more other systems. For example, the mobile application module service may interact with a service provider system to obtain information that may be used as input data, such as account information, usage information, payment information, billing information, etc.

Using the determined input data, at block 508 the mobile application module service may execute the mobile application module rules engine to determine a current module state for the mobile application. This determined current module state may indicate one or more modules to be configured with the mobile application based on the context associated with the mobile application (e.g., user, device, system, account, usage, payment, network parameters, etc.). The determined current module state may also, or instead, indicate various configuration parameters and/or characteristics of the modules and/or various configuration parameters and/or characteristics of the mobile application. As noted herein, the mobile application module service may determine a current module state based on modules that are currently available for the mobile application, such as determining the most current versions of such modules.

At block 510, the mobile application module service may generate a module update instructions message that includes an indication of the current module state and/or associated data. The module update instructions message may include identifiers of one or more modules that should currently be configured with the mobile application and/or one or more identifiers and/or locations of module sources (e.g., module databases). Alternately, or in addition, the module update instructions message may include a portion or the entirety of one or more modules. Further at block 510, the mobile application module service may transmit this module update instructions message to the mobile application.

In summary, by determining which modules are needed for a mobile application at a particular point in time and/or in a particular context, the mobile application may be able to provide the applicable and expected features to a user while avoiding the unnecessary user device resource utilization that would take place by configuring unneeded and/or unavailable modules with a mobile application.

Example Clauses

A: A method performed by a mobile device, the method comprising: determining state data for a mobile application configured to execute on the mobile device, the mobile application configured to operate with a plurality of modules configured on the mobile device; transmitting a module update request to a mobile application module service, the module update request comprising a subset of the state data; receiving a module update message from the mobile application module service, the module update message comprising an indication of at least one module of a plurality of available modules associated with the mobile application, the at least one module comprising less than all of the plurality of available modules associated with the mobile application; determining that the at least one module is not associated with the plurality of modules configured on the mobile device; in response to determining that the at least one module is not associated with the plurality of modules configured on the mobile device, obtaining the at least one module from a module database; configuring the at least one module on the mobile device; and associating the at least one module with the plurality of modules configured on the mobile device for operation with the mobile application.

B: The method of paragraph A, further comprising: determining that the module update message does not comprise an indication of a second module associated with the plurality of modules configured on the mobile device; and deleting the second module from the mobile device.

C: The method of paragraph A or B, further comprising detecting an expiration of a heartbeat interval, wherein determining the state data for the mobile application comprises determining the state data for the mobile application comprises in response to detecting the expiration of the heartbeat interval.

D: The method of any of paragraphs A-C, wherein transmitting the module update request to the mobile application module service comprises: determining that at least one portion of the state data differs from a corresponding at least one portion of prior state data; and in response to determining that the at least one portion of the state data differs from the corresponding at least one portion of the prior state data, transmitting the module update request to the mobile application module service.

E: The method of any of paragraphs A-D, further comprising detecting a deactivation of the mobile application, wherein determining the state data for the mobile application comprises determining the state data for the mobile application in response to detecting the deactivation of the mobile application.

F: The method of any of paragraphs A-E, wherein the indication of the at least one module comprises a flag associated with a feature of the mobile application.

G: The method of paragraph F, further comprising determining the module associated with the mobile application based at least in part on the flag.

H: A system including a mobile application module service comprising: one or more processors; and non-transitory computer-readable media storing computer-executable instructions that, when executed by the one or more processors, cause the one or more processors to perform operations comprising: receiving a module update request from a mobile application executing on a mobile device, the module update request comprising mobile application state data; generating rules engine input data based at least in part on the mobile application state data; executing a rules engine using the rules engine input data; generating module update instructions comprising an indication of at least one module of a plurality of available modules associated with the mobile application, the at least one module comprising less than all of the plurality of available modules associated with the mobile application; and transmitting the module update instructions to the mobile application.

I: The system of paragraph H, wherein the mobile application state data comprises one or more of: user data; device data; network data; or service data.

J: The system of paragraph H or I, wherein generating the rules engine input data is further based at least in part on data obtained from a remote system based at least in part on the mobile application state data.

K: The system of any of paragraphs H-J, wherein the at least one module comprises one or more of: a user interface component; a user experience template; a core library; or a function module.

L: The system of any of paragraphs H-K, wherein the module update instructions comprise the at least one module.

M: The system of any of paragraphs H-L, wherein the module update instructions comprise a configuration of the mobile application.

N: The system of any of paragraphs H-M, wherein the operations further comprise: detecting an update of the at least one module at a module database; and in response to the update of the at least one module, updating one or more rules of the rules engine.

O: A mobile device comprising: one or more processors; and non-transitory computer-readable media storing computer-executable instructions that, when executed by the one or more processors, cause the one or more processors to perform operations comprising: detecting activation of a mobile application configured to execute on the mobile device, the mobile application configured to operate with a plurality of modules configured on the mobile device; in response to detecting the activation of the mobile application, determining state data for the mobile application; transmitting a module update request to a mobile application module service, the module update request comprising a subset of the state data; receiving a module update message from the mobile application module service, the module update message comprising a flag associated with a feature of the mobile application; determining at least one module associated with the flag, wherein the at least one module is associated with a plurality of available modules associated with the mobile application, and wherein the at least one module comprises less than all of the plurality of available modules associated with the mobile application; determining that the at least one module is not associated with the plurality of modules configured on the mobile device; in response to determining that the at least one module is not associated with the plurality of modules configured on the mobile device, configuring the at least one module on the mobile device; and associating the at least one module with the plurality of modules for operation with the mobile application.

P: The mobile device of paragraph O, wherein the module update message further comprises an indication of a location of a module database.

Q: The mobile device of paragraph O or P, wherein the operations further comprise: determining a second module based at least in part on the module update message; and deleting the second module from the mobile device.

R: The mobile device of any of paragraphs O-Q, wherein the state data comprises a length of time a user of the mobile device has been a customer of a provider of the mobile device.

S: The mobile device of any of paragraphs O-R, wherein determining the at least one module associated with the flag comprises: identifying the feature associated with the flag; and identifying the at least one module associated with the feature.

T: The mobile device of any of paragraphs O-S, wherein the operations further comprise determining that at least one portion of the state data differs from a corresponding at least one portion of prior state data; and in response to determining that the at least one portion of the state data differs from the corresponding at least one portion of the prior state data, transmitting the module update request to the mobile application module service.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a mobile device, the method comprising:
   determining state data for a mobile application configured to execute on the mobile device, the mobile application configured to operate with a plurality of modules configured on the mobile device;
   transmitting a module update request to a mobile application module service, the module update request comprising a subset of the state data;
   receiving a module update message from the mobile application module service, the module update message comprising an indication of at least one module of a plurality of available modules associated with the mobile application, the at least one module comprising less than all of the plurality of available modules associated with the mobile application;
   determining that the at least one module is not associated with the plurality of modules configured on the mobile device;
   in response to determining that the at least one module is not associated with the plurality of modules configured on the mobile device, obtaining the at least one module from a module database;
   configuring the at least one module on the mobile device; and associating the at least one module with the plurality of modules configured on the mobile device for operation with the mobile application.

2. The method of claim 1, further comprising:
determining that the module update message does not comprise an indication of a second module associated with the plurality of modules configured on the mobile device; and
deleting the second module from the mobile device.

3. The method of claim 1, further comprising detecting an expiration of a heartbeat interval, wherein determining the state data for the mobile application comprises determining the state data for the mobile application comprises in response to detecting the expiration of the heartbeat interval.

4. The method of claim 1, wherein transmitting the module update request to the mobile application module service comprises:
determining that at least one portion of the state data differs from a corresponding at least one portion of prior state data; and
in response to determining that the at least one portion of the state data differs from the corresponding at least one portion of the prior state data, transmitting the module update request to the mobile application module service.

5. The method of claim 1, further comprising detecting a deactivation of the mobile application, wherein determining the state data for the mobile application comprises determining the state data for the mobile application in response to detecting the deactivation of the mobile application.

6. The method of claim 1, wherein the indication of the at least one module comprises a flag associated with a feature of the mobile application.

7. The method of claim 6, further comprising determining the module associated with the mobile application based at least in part on the flag.

8. A mobile device comprising:
one or more processors; and
non-transitory computer-readable media storing computer-executable instructions that, when executed by the one or more processors, cause the one or more processors to perform operations comprising:
detecting activation of a mobile application configured to execute on the mobile device, the mobile application configured to operate with a plurality of modules configured on the mobile device;
in response to detecting the activation of the mobile application, determining state data for the mobile application;
transmitting a module update request to a mobile application module service, the module update request comprising a subset of the state data;
receiving a module update message from the mobile application module service, the module update message comprising a flag associated with a feature of the mobile application;
determining at least one module associated with the flag, wherein the at least one module is associated with a plurality of available modules associated with the mobile application, and wherein the at least one module comprises less than all of the plurality of available modules associated with the mobile application;
determining that the at least one module is not associated with the plurality of modules configured on the mobile device;
in response to determining that the at least one module is not associated with the plurality of modules configured on the mobile device, configuring the at least one module on the mobile device; and
associating the at least one module with the plurality of modules for operation with the mobile application.

9. The mobile device of claim 8, wherein the module update message further comprises an indication of a location of a module database.

10. The mobile device of claim 8, wherein the operations further comprise:
determining a second module based at least in part on the module update message; and
deleting the second module from the mobile device.

11. The mobile device of claim 8, wherein the state data comprises a length of time a user of the mobile device has been a customer of a provider of the mobile device.

12. The mobile device of claim 8, wherein determining the at least one module associated with the flag comprises:
identifying the feature associated with the flag; and
identifying the at least one module associated with the feature.

13. The mobile device of claim 8, wherein the operations further comprise determining that at least one portion of the state data differs from a corresponding at least one portion of prior state data; and
in response to determining that the at least one portion of the state data differs from the corresponding at least one portion of the prior state data, transmitting the module update request to the mobile application module service.

14. A non-transitory computer storage medium having a plurality of programming instructions stored thereon that, when executed by a mobile device, cause the mobile device to perform operations comprising:
determining state data for a mobile application configured to execute on the mobile device, the mobile application configured to operate with a plurality of modules configured on the mobile device;
transmitting a module update request to a mobile application module service, the module update request comprising a subset of the state data;
receiving a module update message from the mobile application module service, the module update message comprising an indication of at least one module of a plurality of available modules associated with the mobile application, the at least one module comprising less than all of the plurality of available modules associated with the mobile application;
determining that the at least one module is not associated with the plurality of modules configured on the mobile device;
in response to determining that the at least one module is not associated with the plurality of modules configured on the mobile device, obtaining the at least one module from a module database;
configuring the at least one module on the mobile device; and
associating the at least one module with the plurality of modules configured on the mobile device for operation with the mobile application.

15. The non-transitory computer storage medium of claim 14, wherein the operations further comprise:

determining that the module update message does not comprise an indication of a second module associated with the plurality of modules configured on the mobile device; and deleting the second module from the mobile device.

16. The non-transitory computer storage medium of claim 14, wherein the operations further comprise detecting an expiration of a heartbeat interval, wherein determining the state data for the mobile application comprises determining the state data for the mobile application comprises in response to detecting the expiration of the heartbeat interval.

17. The non-transitory computer storage medium of claim 14, wherein transmitting the module update request to the mobile application module service comprises:

determining that at least one portion of the state data differs from a corresponding at least one portion of prior state data; and in response to determining that the at least one portion of the state data differs from the corresponding at least one portion of the prior state data, transmitting the module update request to the mobile application module service.

18. The non-transitory computer storage medium of claim 14, wherein the operations further comprise detecting a deactivation of the mobile application, wherein determining the state data for the mobile application comprises determining the state data for the mobile application in response to detecting the deactivation of the mobile application.

19. The non-transitory computer storage medium of claim 14, wherein the indication of the at least one module comprises a flag associated with a feature of the mobile application.

20. The non-transitory computer storage medium of claim 19, wherein the operations further comprise determining the module associated with the mobile application based at least in part on the flag.

* * * * *